US010008005B2

(12) United States Patent
Lai et al.

(10) Patent No.: US 10,008,005 B2
(45) Date of Patent: Jun. 26, 2018

(54) MEASUREMENT SYSTEM AND METHOD FOR MEASURING MULTI-DIMENSIONS

(71) Applicant: Industrial Technology Research Institute, Hsinchu (TW)

(72) Inventors: Yueh-Yi Lai, Hsinchu County (TW); Kun-Lung Tseng, New Taipei (TW); Zih-Jian Jhang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 99 days.

(21) Appl. No.: 15/353,704

(22) Filed: Nov. 16, 2016

(65) Prior Publication Data
US 2018/0075618 A1 Mar. 15, 2018

(30) Foreign Application Priority Data

Sep. 10, 2016 (TW) .............................. 105129451 A

(51) Int. Cl.
*H04N 13/02* (2006.01)
*G06T 7/60* (2017.01)
*G06T 7/00* (2017.01)

(52) U.S. Cl.
CPC ............ *G06T 7/602* (2013.01); *G06T 7/0065* (2013.01); *H04N 13/0275* (2013.01);
(Continued)

(58) Field of Classification Search
CPC .... G06T 7/602; G06T 7/0065; H04N 13/0275
(Continued)

(56) References Cited

U.S. PATENT DOCUMENTS 7,689,003 B2  3/2010  Shannon et al.
8,010,315 B2  8/2011  Wu et al.
(Continued)

FOREIGN PATENT DOCUMENTS

CN  104268935     1/2015
CN  104330074 A   2/2015
(Continued)

OTHER PUBLICATIONS

Taiwan Patent Office, Office Action, Patent Application Serial No. 105129451, dated Jul. 6, 2017, Taiwan.
(Continued)

*Primary Examiner* — Nguyen Truong

(57) ABSTRACT

Measurement system and method for measuring multi-dimensions of an object are provided. A two-dimensional (2D) image capturing device captures at least one macro-2D image of the object. A three-dimensional (3D) information acquisition device acquires micro-3D measured data of the object. A integration and estimation device performs 2D and 3D image correction on macro-2D image and micro-3D measured data to map micro-3D measured data into macro-2D image to output 3D-topography data corresponding to macro-2D image of the object, and based on machine learning mechanism, performs matching procedure on at least one connection feature between any two positions in 3D-topography data with a database to elect an adapted model. Based on its corresponding to at least one fitting function, the integration and estimation device estimates the connection features of 3D-topography data to output at least one estimated feature amount, thereby obtaining measurement results corresponding to the object.

18 Claims, 9 Drawing Sheets

(52) U.S. Cl.
CPC ............... *G06T 2207/10004* (2013.01); *G06T 2207/10028* (2013.01); *G06T 2207/10056* (2013.01); *G06T 2207/20016* (2013.01); *G06T 2207/20081* (2013.01)

(58) Field of Classification Search
USPC .......................................................... 348/47
See application file for complete search history.

(56) References Cited

U.S. PATENT DOCUMENTS

| | | |
|---|---|---|
| 8,244,025 B2 | 8/2012 | Davis et al. |
| 8,477,154 B2 | 7/2013 | Davis et al. |
| 8,809,756 B1 | 8/2014 | Yoshida |
| 8,866,114 B2 | 10/2014 | Shirai et al. |
| 9,117,278 B2 | 8/2015 | Ehrlich et al. |
| 2013/0249901 A1 | 9/2013 | Sweet et al. |

FOREIGN PATENT DOCUMENTS

| | | |
|---|---|---|
| CN | 104794756 | 7/2015 |
| CN | 105608737 | 5/2016 |
| JP | 4266333 B2 | 2/2009 |
| JP | 2016011854 | 1/2016 |
| TW | 200612358 | 4/2006 |
| TW | 201346833 | 11/2013 |
| TW | 201349173 | 12/2013 |
| TW | 201404049 | 1/2014 |
| TW | 201624326 | 7/2016 |

OTHER PUBLICATIONS

Andrew W. Fitzgibbon., "Robust Registration of 2D and 3D Point Sets," Image and Vision Computing, Dec. 2003, pp. 1145-1153, vol. 21, Issues 13-14, Elsevier, UK.

Jiaolong Yang et al., "Go-ICP Solving 3D Registration Efficiently and Globally Optimally," Computer Vision (ICCV), 2013, IEEE International Conference on, Dec. 2013, pp. 1-8, IEEE, US.

US 10,008,005 B2

MEASUREMENT SYSTEM AND METHOD FOR MEASURING MULTI-DIMENSIONS

CROSS REFERENCE TO RELATED APPLICATIONS

The present application is based on, and claims priority from, Taiwan Application Serial Number 105129451, filed on Sep. 10, 2016, the disclosure of which is hereby incorporated by reference herein in its entirety.

TECHNICAL FIELD

The technical field relates to a measurement system and a measurement method for measuring multiple dimensions of an object.

BACKGROUND

Recently, with the development of industrial automated detection technology, automation in factory production is growing. Factory production combined with automated detection techniques can be used to reduce production line errors and speed up production. Currently, due to the demand for customization, object design with small-volume and large-variety production has become a major trend in the industry. Conventionally, two-dimensional (2D) projection images are widely used in object measurement, and such measurements 2D projection images can achieve high accuracy and automation of rapid detection in detecting objects of different sizes. However, the biggest challenge in such measurements is how to perform a multi-dimensional size measurement on three-dimensional (3D) object detection.

In general, the multi-dimensional size measurement performed by contact-type measurement. Although the measurement accuracy for the contact-type measurement is good enough, it has a drawback in that its measurement speed is too slow. Accordingly, there is demand for providing quickly and highly accurate measurement results on the multi-dimensional size measurement of an object to be measured.

SUMMARY

An exemplary embodiment of a measurement system for multi-dimensional measurement comprises a two-dimensional (2D) image capturing device, a three-dimensional (3D) information acquisition device, an integration and estimation device and a display device. The 2D image capturing device is configured to capture at least one macroscopic 2D image of an object to be measured, wherein the macroscopic 2D image corresponds to all areas of the object. The 3D information acquisition device is configured to acquire microscopic 3D measurement data of the object, wherein the microscopic 3D measurement data corresponds to some of the areas of the object. The integration and estimation device is coupled to the 2D image capturing device and the 3D information acquisition device and is configured to receive the macroscopic 2D image and the microscopic 3D measurement data and perform a 2D and 3D image correction on the macroscopic 2D image and the microscopic 3D measurement data to map the microscopic 3D measurement data into the macroscopic 2D image so as to output 3D topography data corresponding to the macroscopic 2D image of the object. The display device is coupled to the integration and estimation device and is configured to display one or more measurement results corresponding to the object. The integration and estimation device performs a matching procedure on at least one connection feature between any two positions in the 3D topography data with a plurality of 2D models in a database based on a machine learning mechanism to elect an adapted model, and estimates all of the connection features of the 3D topography data based on at least one fitting function corresponding to the adapted model so as to output at least one estimated feature amount, thereby obtaining the one or more measurement results corresponding to the object.

In another exemplary embodiment, a method of multi-dimensional measurement for use in a measurement system is provided, wherein the measurement system at least comprises a two-dimensional (2D) image capturing device, a three-dimensional (3D) information acquisition device, an integration and estimation device and a display device, the method comprises the steps of: capturing, by the 2D image capturing device, at least one macroscopic 2D image of an object to be measured, wherein the macroscopic 2D image corresponds to all areas of the object; acquiring, by the 3D information acquisition device, microscopic 3D measurement data of the object, wherein the microscopic 3D measurement data corresponds to some of the areas of the object; performing, by the integration and estimation device, a 2D and 3D image correction on the macroscopic 2D image and the microscopic 3D measurement data to map the microscopic 3D measurement data into the macroscopic 2D image so as to output 3D topography data corresponding to the macroscopic 2D image of the object; performing, by the integration and estimation device, a matching procedure on at least one connection feature between any two positions in the 3D topography data with a plurality of 2D models in a database based on a machine learning mechanism to elect an adapted model, and estimating all of the connection features of the 3D topography data based on at least one fitting function corresponding to the adapted model so as to output at least one estimated feature amount, thereby obtaining one or more measurement results corresponding to the object; and displaying, by the display device, the one or more measurement results corresponding to the object.

BRIEF DESCRIPTION OF THE DRAWINGS

The application will become more fully understood by referring to the following detailed description with reference to the accompanying drawings, wherein.

DETAILED DESCRIPTION OF EMBODIMENTS

Figure 1:
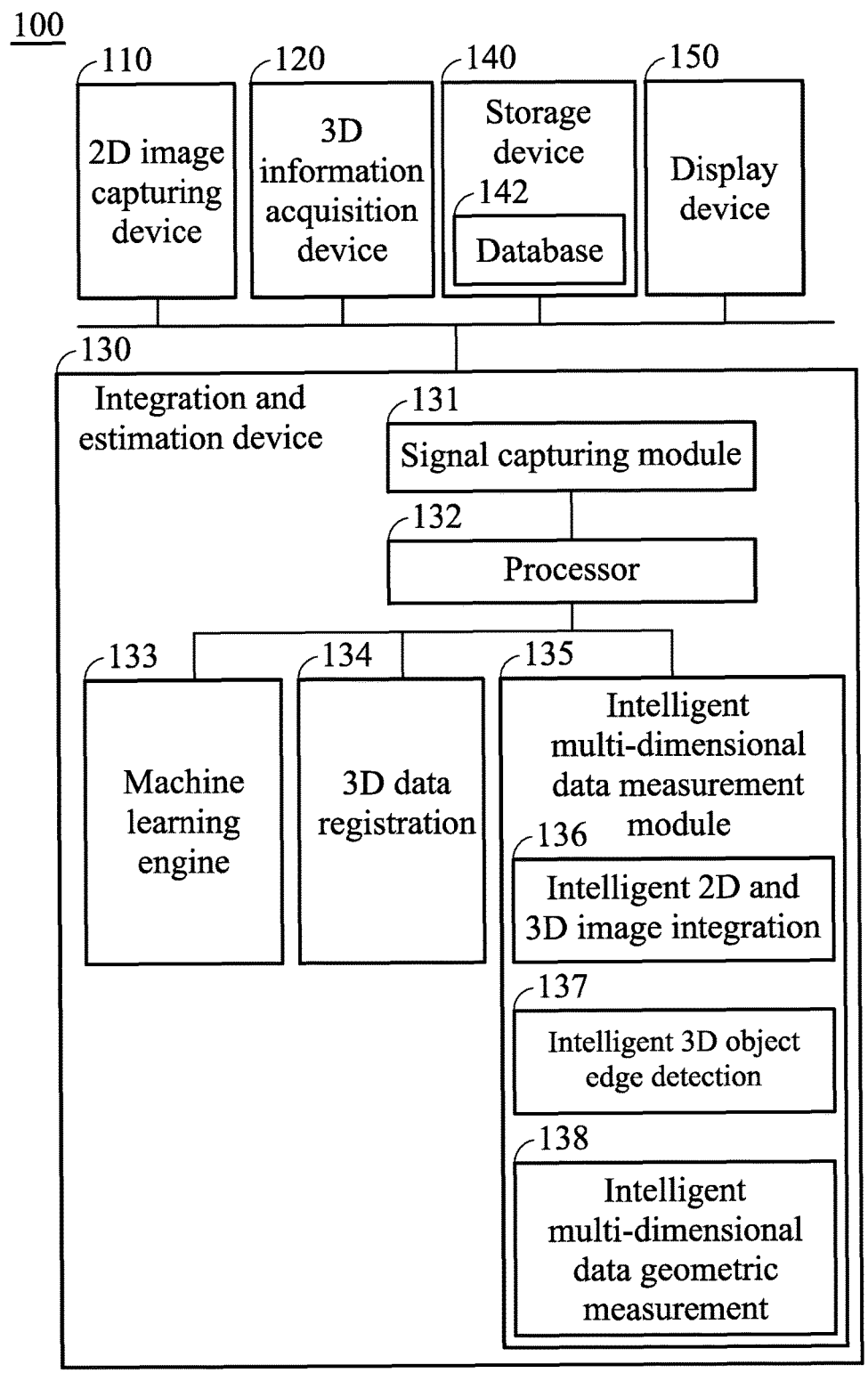
FIG. 1 is a schematic diagram of a multi-dimensional measurement system according to an exemplary embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

On the multi-dimensional size measurement of an object to be measured, 2D projection is widely used in object measurement in order to obtain the measurement accuracy. However, more and more multi-dimensional size measurement needs are difficult to be met or performed by the 2D projection. In order to achieve the 3D topography measurement needs, one way is to use a contact-type measurement system (e.g., stylus profilometer) to meet the requirement of being highly accurate (i.e., measurement error of <0.005 mm). However, its detection speed is generally too slow, and thus it is difficult to meet the requirements for field operations. Another way to measure the 3D topography does not use a contact-type measurement system, for example, using structured light projection for 3D object modeling. Although such measuring can speed up the detection speed, it is difficult to achieve high accuracy requirement, such as the requirement of a measurement error<0.005 mm.

Accordingly, embodiments of the application provide management systems of multi-dimensional measurement that integrate 3D depth information and 2D image in measuring multi-dimensions of an object and related methods for measuring multi-dimensions of the object, which can integrate the 3D data and 2D image at the same time based on a 3D information and image stitching technology and can retrieve useful information, e.g., information about a detecting plane or surface of the object to be measured, a detecting edge for the object to be measured and so on, from the 3D information (e.g., point cloud data) based on an intelligent image segmentation technology, so as to utilize these geometric features to perform multi-dimensional size measurement on the object to obtain the measured size of the object, achieving the purpose of the multi-dimensional size measurement.

FIG. 1 is a schematic diagram of a multi-dimensional measurement system 100 according to an embodiment. As shown in FIG. 1, the multi-dimensional measurement system 100 (hereinafter referred to as the measurement system 100) includes a 2D image capturing device 110, a 3D information acquisition device 120, an integration and estimation device 130, a storage device 140 and a display device 150. The measurement system 100 can perform multi-dimensional measurements on an object to be measured. The object may be any 3D element.

The 2D image capturing device 110 may be any image capturing device having 2D image output functions, such as a camera or lens module with Charge Coupled Device (CCD) elements or Complementary Metal Oxide Semiconductor (CMOS) sensing elements or the like. The resolution of the 2D image may be any resolution, such as a resolution of 1280*1024, 5K, 4K, Full HD or the like. The 2D image capturing device 110 is configured to capture one or more macroscopic 2D images of the object to be measured. Note that the macroscopic 2D image refers to a 2D image having the whole field of the object to be measured, such as a complete projection image of the object to be measured and so on.

The 3D information acquisition device 120 may be configured to acquire microscopic 3D measurement data of the object to be measured. Note that the microscopic 3D measurement data refers to the 3D measurement data corresponding to some areas of the object, such as measurement results about the distribution of the measured data a specific cross-sectional shape of the object to be measured, an edge or corner of the object to be measured or the like. The 3D information acquisition device 120 may be a non-contact image capturing device, which may be any non-contact 3D data acquisition device, such as a stereovision module with dual-camera, a stereovision module using structured light projection and random pattern, a stereovision module using laser triangulation ranger, a stereovision module using a time of flight algorithm and so on. Such stereoscopic module may have a corresponding hardware circuit to achieve the desired functionality.

In the illustrated embodiment of FIG. 1, the 3D information acquisition device 120 can acquire the depth, the distribution of surface topography, distance information or other information of the object to be measured using a non-contact way such as an optical image projection, so the measurement speed is faster, but the application is not limited thereto. In one embodiment, the 3D information acquisition device 120 can also use a contact way to the depth, the distribution of surface topography, distance information or other information of the object to be measured.

In some embodiments, the 3D information acquisition device 120 may further include a depth signal acquisition element, a depth information calculation element and a depth information output element (not shown). The depth signal acquisition element (e.g., a depth sensor) is configured to receive depth signals from the object. The depth information calculation element (e.g., a depth sensing and calculation chip) is configured to calculate depth information for the object according to the depth signals of the object received by the depth signal acquisition element. The depth information output element is configured to output the depth information for the object calculated by the depth information calculation element as the 3D measurement information required. For example, the 3D information acquisition device 120 may be a depth sensor, a depth camera, a 3D scanner and any physical devices capable of retrieving and obtaining the depth information of the object. For example, the 3D measurement information may correspond to a set of point cloud data corresponding to the object, and these point cloud data may be used to interpolate into a surface shape of the object to perform a three-dimensional reconstruction. The more dense point cloud may be established, the more accurate the model is. Due to the limited scanning range of a capturing element, conversion to the relative position of the capturing element and the object are needed to perform a plurality of scans to stitch together a complete model of the object. Therefore, further image registration or alignment operation should be performed to integrate more than one slice of models into a complete model.

The storage device 140 may be a non-volatile storage medium (e.g., Read-Only Memory (ROM), Flash memory, magnetic tape, hard disk, or optical disc), or a volatile storage medium (e.g., Random Access Memory (RAM)), or any combination thereof for storing data, such as intermediate data generated during the calculation process and the calculation result information and so on. The storage device 140 may further include a database 142 for storing a plurality of 2D linear models (e.g., line models), wherein each of the 2D models corresponds to at least one linear fitting function. For example, the fitting function may be one or more linear fitting equations, one or more of polynomial fitting functions, one or more parabolic curve fitting functions or any combination thereof, but the application is not limited thereto. In one embodiment, each of the 2D linear models may correspond to a parabolic curve fitting function.

The integration and estimation device 130 which is coupled to the 2D image capturing device 110, the 3D information acquisition device 120, the storage device 140 and the display device 150 via a wired or wireless connection, which may be used to execute one or more types of computer-readable mediums stored within the storage devices 140 to perform the method of multi-dimensional measurement of the object of the present application based on the macroscopic 2D image captured by the 2D image capturing device 110 and the microscopic 3D measurement data acquired by the 3D information acquisition device 120, which will be discussed further in the following paragraphs.

The integration and estimation device 130 further includes a signal capturing module 131, a processor 132, a machine learning engine 133, a 3D data registration 134 and an intelligent multi-dimensional data measurement module 135. The signal acquisition module 131 may be used to receive the 2D projection image captured by the 2D image capturing device 110 and the 3D information acquired by the 3D information acquisition device 120. The processor 132 may be a Central Processing Unit (CPU), Micro-Control Unit (MCU), Digital Signal Processor (DSP), a general purpose processor or a special purpose processor or the like, which provides the function of data processing and computing.

The 3D data registration 134 in the present embodiment can process the 3D information acquired by the non-contact optical image capturing device through a 3D image registration technology to link and process the 3D data through the 3D data registration. The 3D data registration in this embodiment can compare and integrate 3D point cloud data acquired in different conditions (e.g., different ambient light, different device angle and so on) to integrate a plurality of local 3D models of the object into a complete 3D model, so as to facilitate the intelligent multi-dimensional data measurement module 135 to establish a virtual object corresponding to the object be measured to simulate the object being measured and perform subsequent measurements on the virtual object.

The intelligent 2D and 3D image integration module 136 may be configured to combine edge information of the 2D image and the 3D information. In this embodiment, the edge information does not include surface information of the object to be measured in the captured 2D image, such as the surface material, the surface color or the like for the object to be measured, but the present application is not limited thereto.

In this embodiment, the intelligent 3D object edge detection module 137 may be configured to perform edge detection on the virtual object after combining the 2D and 3D images, so as to perform further operations, such as measured surface determination for the virtual object, edge detection for the measured surface on the virtual object and so on.

In this embodiment, the intelligent multi-dimensional data geometric measurement module 138 can perform various measurements on the virtual object, such as distance measurement, measuring the angle between the lines in the virtual object and any other geometric measurements, based on the edge information obtained by the intelligent 3D object edge detection module 137.

In this embodiment, specifically, the integration and estimation device 130 can control the operations of the signal capturing module 131, the machine learning engine 133, the 3D data registration 134 and the intelligent multi-dimensional data measurement module 135 through the processor 132 to receive one or more of the macroscopic 2D images and one or more pieces of the microscopic 3D measurement data and perform a 2D and 3D image correction on the macroscopic 2D image and the microscopic 3D measurement data to map the microscopic 3D measurement data into the macroscopic 2D image so as to output 3D topography data corresponding to the macroscopic 2D image of the object. Specifically, each of the microscopic 3D measurement data may correspond to a part of the areas of the object to be measured, and the integration and estimation device 130 may be estimate a corresponding position in the macroscopic 2D image for each microscopic 3D measurement data through the 2D and 3D image correction and then map all of the microscopic 3D measurement data into the corresponding positions in the macroscopic 2D image based on an intelligent image segmentation technology as to output 3D topography data corresponding to the macroscopic 2D image of the object. Relevant details will be described below.

In this embodiment, the integration and estimation device 130 can estimate each connection feature between any two positions in the 3D topography data. Specifically, the machine learning engine 132 of the integration and estimation device 130 can perform a matching procedure on each connection feature between any two positions in the 3D topography data with a plurality of 2D linear models in the database 142 based on a machine learning mechanism to elect an adapted model from the plurality of 2D linear models in the database 142 and estimate all of the connection features based on one or more fitting functions corresponding to the adapted model to output one or more estimated feature amounts. The integration and estimation device 130 can then integrate together one or more estimated feature amounts corresponding to all of the connection features to obtain one or more corresponding measurement results. Such measurement result may be, for example, an estimated feature amount representing physical shape (including a geometrical structure and so on) and appearance information of the object being measured.

In this embodiment, the display device 150 may be any device capable of displaying or presenting measured results. The display device 150 can display related data, such as texts, figures, interfaces, and/or information such as displaying or presenting measurement results. The display device 150 may be configured to present an image of the measurement results (including any video format, such as bmp, jpg, png and other formats) or present a screen of the measurement results, for example: a liquid crystal display (LCD). It should be understood that, in some embodiments, the display device 150 may be a screen integrated with a touch-sensitive device (not shown). The touch-sensitive device has a touch-sensitive surface comprising sensors in at least one dimension to detect contact and movement of at least one object (input tool), such as a pen/stylus or finger near or on the touch-sensitive surface. Accordingly, users are able to input commands or signals via the display device 150.

It should be understood that each of the elements or modules in the presented embodiments may be a device having a corresponding function, which can have the appropriate hardware circuits or elements to perform the corresponding function, however, the device is not limited to be entity device, which can also be a virtual device having program and software with respective functions or a device having capabilities for processing and running the program and software. The manner of operations of the respective elements can further refer to the following description of the methods. Specifically, the management system 100 can control the operation of the 2D image capturing device 110, the 3D information acquisition device 120, the integration and estimation device 130, the storage device 140 and the display device 150 to perform the method of multi-dimensional measurement of the application in order to measure the size of a 3D object to be measured, which will be discussed further in the following paragraphs.

Figure 2:
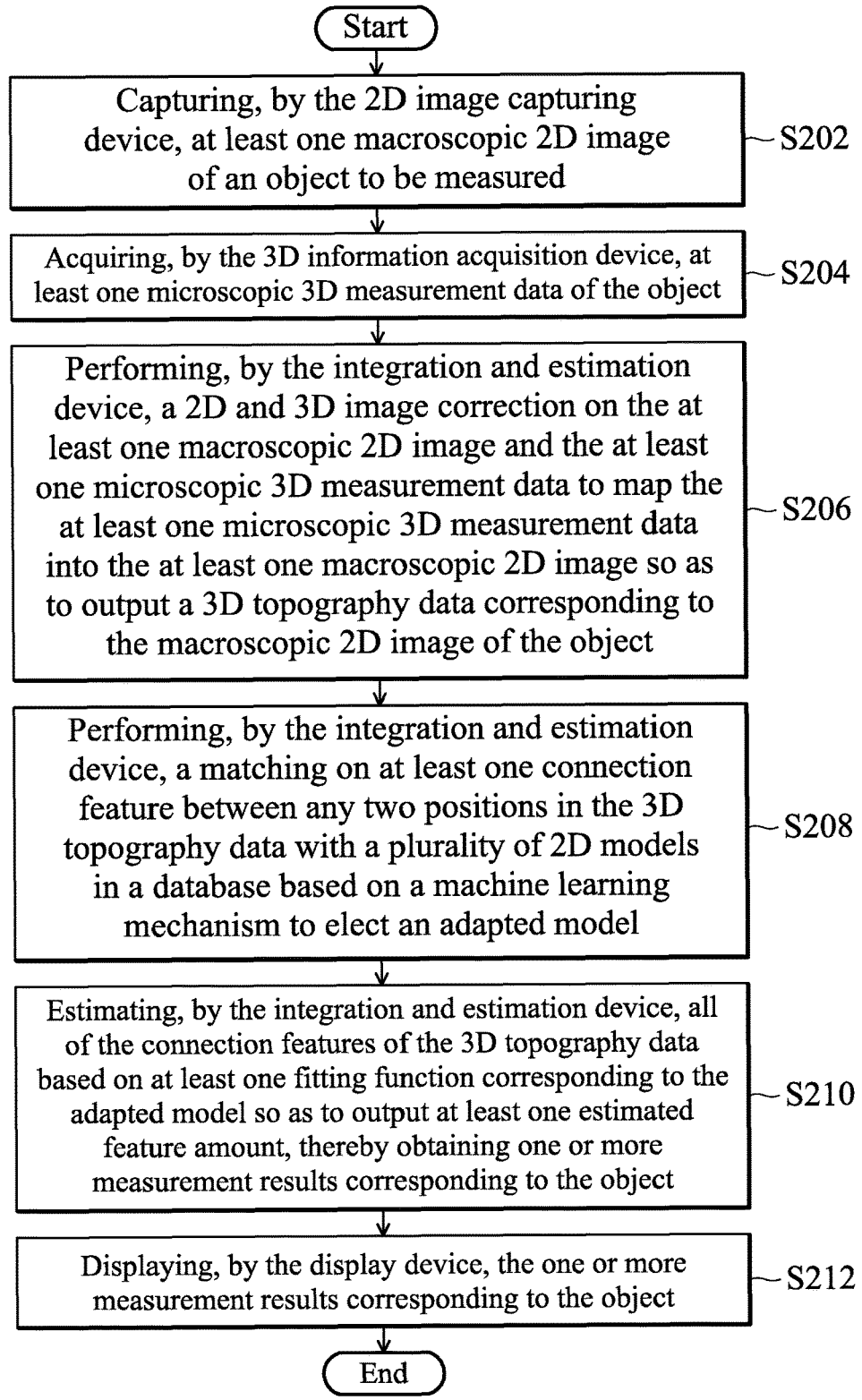
FIG. 2 is a flowchart of a multi-dimensional measurement method according to an embodiment.

FIG. 2 is a flowchart of a method of multi-dimensional measurement according to an embodiment of the application. The method of multi-dimensional measurement of the application may be applied to a measurement system, which at least includes a 2D image capturing device, a 3D information acquisition device, an integration and estimation device and a display device, such as the measurement system 100 as shown in FIG. 1, and the method may be performed by the measurement system.

When a measurement on an object to be measured (e.g. a 3D object) is being performed, in step S202, one or more macroscopic 2D images of the 3D object being measured are captured by the 2D image capturing device 110 and then in step S304, microscopic 3D measurement data of the object is acquired by the 3D information acquisition device 120. The macroscopic 2D images correspond to all areas of the 3D object while the at least one microscopic 3D measurement data corresponds to some of the areas of the 3D object. For example, the macroscopic 2D image may be a 2D projection image of the 3D object and the microscopic 3D measurement data may be point cloud data corresponding to an arc-shaped structure in the 3D object.

Figure 3:
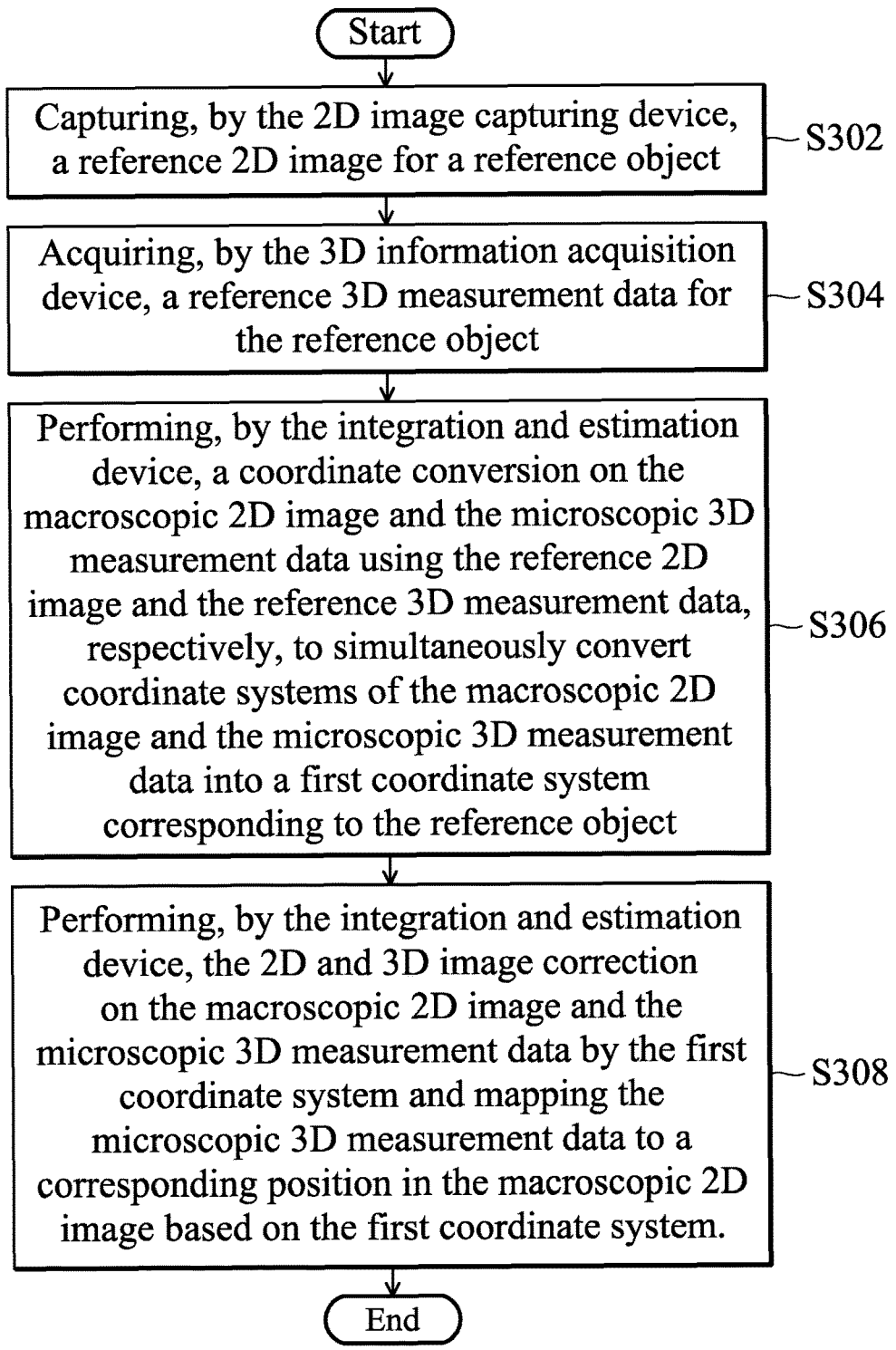
FIG. 3 is a flowchart of a method for performing 2D and 3D image correction and integration according to an embodiment.

In step S206, a 2D and 3D image correction is performed on the at least one macroscopic 2D image and the microscopic 3D measurement data by the integration and estimation device 130 to map the microscopic 3D measurement data into the at least one macroscopic 2D image so as to output 3D topography data corresponding to the macroscopic 2D image of the 3D object. In this embodiment, a reference object is provided to be used as a basis of image correction and integration algorithms for the 2D and 3D information, in which the reference object is applied to the coordinate conversion to convert original 2D images and the 3D images with different coordinate systems to be represented in the same coordinate system, so as to effectively integrate the 2D and 3D information, but the present application is not limited thereto. The reference object may be a physical plane or a virtual plane surface. In one embodiment, the reference object may be a physical reference plane, such as including a physical fixture, a physical mechanism or the like. In another embodiment, the reference object may be a virtual represent plane, such as including a central axis of a virtual object in a virtual fitting, or other actual or virtual reference planes or reference lines both existing in the 2D data and 3D data at the same time in the actual or virtual reference plane or reference line. In some embodiments, the reference plane is not limited to with a flat plane, and it can also be a curved plane, a discontinuous plane or any combination of reference plane thereof FIG. 3 is a flowchart of a method for performing 2D and 3D image correction and integration according to an embodiment of the application. The method for performing 2D and 3D image correction and integration of the application may be applied to the measurement system 100 as shown in FIG. 1.

In step S302, a reference 2D image for a reference object is captured by the 2D image capturing device 110 and then in step S304, a reference 3D measurement data for the reference object is acquired by the 3D information acquisition device 120.

After the reference 2D image and the reference 3D measurement data have been obtained, in step S306, a coordinate conversion on the macroscopic 2D image and the microscopic 3D measurement data is performed by the integration and estimation device 130 using the reference 2D image and the reference 3D measurement data, respectively, to simultaneously convert coordinate systems of the macroscopic 2D image and the microscopic 3D measurement data into a first coordinate system corresponding to the reference object.

Specifically, the coordinate conversion in the aforementioned step S306 may be performed based on a field of view (FOV) and an image resolution corresponding to the 2D image capturing device 110 and a FOV and an image resolution corresponding to the 3D information acquisition device 120. In one embodiment, in a case where the FOV of the 2D image capturing device 110 is FOV_2D and the image resolution of the 2D image capturing device 110 is Reso_2D, if a pixel coordinate Pixel_2D_Ref for the reference object is redefined as a new coordinate axis for each pixel coordinate Pixel_xy of the object to be measured in the 2D coordinate system, the converted pixel coordinate New_2D_Pixel_xy for each pixel coordinate Pixel_xy may be expressed as the following formula:

$$\text{New\_2D\_Pixel\_}xy = (\text{Pixel\_}xy - \text{Pixel\_2D\_Ref}) \times (\text{FOV\_2D}/\text{Reso\_2D}) \quad (1).$$

Similarly, in a case where the FOV of the 3D information acquisition device 120 is FOV_3D and the image resolution of the 3D information acquisition device 120 is Reso_3D, if a pixel coordinate Pixel_3D_Ref for the reference object is redefined as a new coordinate axis for each pixel coordinate Pixel_xy of the object to be measured in the 3D coordinate system, the converted pixel coordinate New_3D_Pixel_xy for each pixel coordinate Pixel_xy may be expressed as the following formula:

$$\text{New\_3D\_Pixel\_}xy = (\text{Pixel\_}xy - \text{Pixel\_3D\_Ref}) \times (\text{FOV\_3D}/\text{Reso\_3D}) \quad (2)$$

In this embodiment, as the converted pixel coordinate New_2D_Pixel_xy and the converted pixel coordinate New_3D_Pixel_xy are coordinates in the same coordinate system, they may be integrated into an independent coordinate system.

Thereafter, in step S308, the 2D and 3D image correction is performed on the macroscopic 2D image and the microscopic 3D measurement data by the first coordinate system and the microscopic 3D measurement data is mapped to a corresponding position in the macroscopic 2D image based on the first coordinate system by the integration and estimation device 130.

Referring again to the embodiment of FIG. 2, after the microscopic 3D measurement data have been mapped into the macroscopic 2D image and the 3D topography data corresponding to 3D object has been output, in step S208, a matching procedure is performed by the integration and estimation device 130 on each connection feature between any two positions in the 3D topography data with a plurality of 2D models in a database based on a machine learning mechanism to elect an adapted model from the plurality of 2D models. Specifically, the machine learning engine 133 can elect a best adapted model from the 2D models by machine learning and repetition of the error correction through the neural network. In the category of machine learning, it may be divided into two major parts, which are "grouping" and "learning". Here, the term "grouping" refers to divide original data to groups of data through some analysis and sorting algorithms based on their data characteristics. The more the data is independent as possible, the more it contributes to the subsequent learning. Thereafter, all of the data are further grouped in such as way similar data are classified in the same group. Each data belongs to one of the groups only. Each group may be referred to as a "cluster". For example, traditional classification algorithms may include SVM, Random Forest, K-means and other practices.

On the other hand, the term "learning" refers to a number of operations in which the data after grouping are trained through proper neural network linking and processing similar to human neural networks. During the training process, by correspondence rules between the input and output values, new weights may be generated to learn correspondence therebetween. In the embodiments of the application, neural network algorithms used by the machine learning engine 133 includes algorithms corresponding to a Back Propagation Network (BPN), a Learning Vector Qantization (LVQ), a Counter-Propagation Network (CPN) and the like. The neural network algorithms may include an input layer, a hidden layer and an output layer. Among them, the number of nodes in the input layer is equal to the number of data variables to be input, and the number of nodes in the output layer is equal to the number of output variables to be predicted.

In the embodiments of the application, as the structure of the CPN is similar to that of the BPN and the overall performance and accuracy for the CPN are better than BPN, thus, the algorithms corresponding to the CPN are selected as the machine learning and training algorithms for the neural network of the machine learning engine in the embodiments. However, it should be understood that the application is not limited thereto. It is appreciated that other machine learning algorithms applied to same or similar type of neural networks (for example: algorithm applied to the BPN) may be applied to the machine learning engine of the present application.

Figure 4:
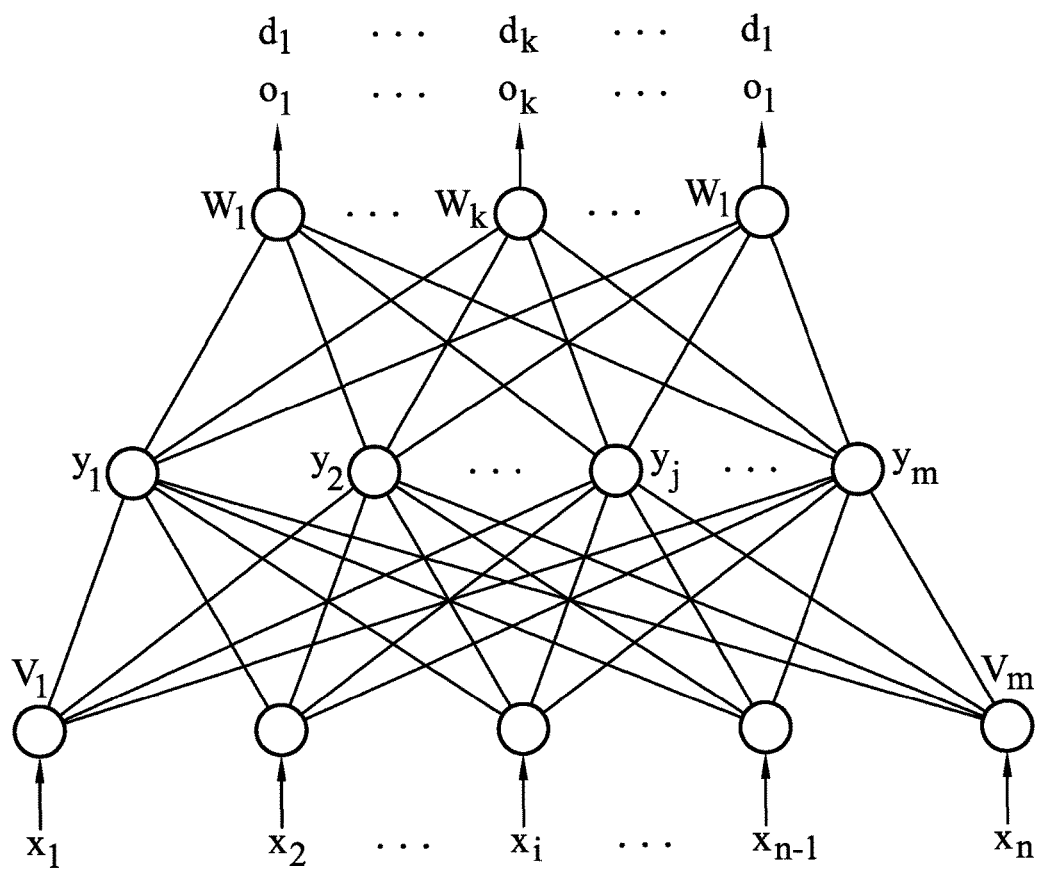
FIG. 4 is a schematic diagram of a neural network according to an embodiment.

FIG. 4 is a schematic diagram illustrating an exemplary embodiment of a neural network of the application. As shown in FIG. 4, the neural network used by the machine learning engine 133 is the CPN having an input layer, a hidden layer and a output layer, wherein the node content of the input layer is the results of feature classification obtained from the previous stage, which may be information regarding a length of the point cloud data range, a width of the point cloud data range, a density of the point cloud data range and others. The output layer may be a linear fitting function 1, a polynomial fitting function 2, a parabolic curve fitting function 3 and any other fitting function capable of fitting the point cloud data. Through the operation of the CPN, the machine learning engine 133 performs an adaption evaluation on the connection feature to be compared and a plurality of 2D linear models in the database so as to elect an adapted 2D linear model from the 2D linear models through the machine learning mechanism. It should be noted that details of specific machine learning-based mechanisms may be practiced by various processing techniques which are well-known by those skilled in the art, and thus such details are omitted here for brevity.

After the adapted model has been elected, in step S210, all of the connection features of the 3D topography data are estimated by the integration and estimation device 130 based on at least one fitting function corresponding to the adapted model elected in step S208 to output at least one estimated feature amount, thereby obtaining one or more measurement results corresponding to the object. Specifically, the integration and estimation device 130 can integrate together one or more estimated feature amounts corresponding to all of the connection features to obtain one or more corresponding measurement results. Such measurement result may be, for example, an estimated feature amount representing physical shape (including a geometrical structure and so on) and appearance information of the object being measured. For example, the integration and estimation device 130 may apply the fitting function (e.g., a parabolic curve equation) corresponding to the adapted model to point cloud data of the microscopic 3D measurement data to construct a 3D shape or 3D topography of the 3D object, such as a virtual object with an arc-shaped structure. Then, various measurements are performed on the virtual object, such as measured surface determination for the virtual object and edge detection or distance measurement for the measured surface on the virtual object, measuring the angle between the lines in the virtual object and any other geometric measurements, to obtain the corresponding estimated feature amount so as to obtain the corresponding measurement results in accordance with one or more corresponding estimated feature amounts.

After the one or more measurement results corresponding to the object have been obtained, in step S212, the one or more measurement results corresponding to the 3D object are displayed by the display device 150. The following embodiments are given to illustrate the details of steps of the method of the application and the present invention is not limited thereto. Measurements of the size of an object of the application are detailed in the following paragraphs with reference to the following section in FIGS. 5 to 8.

Figure 5:
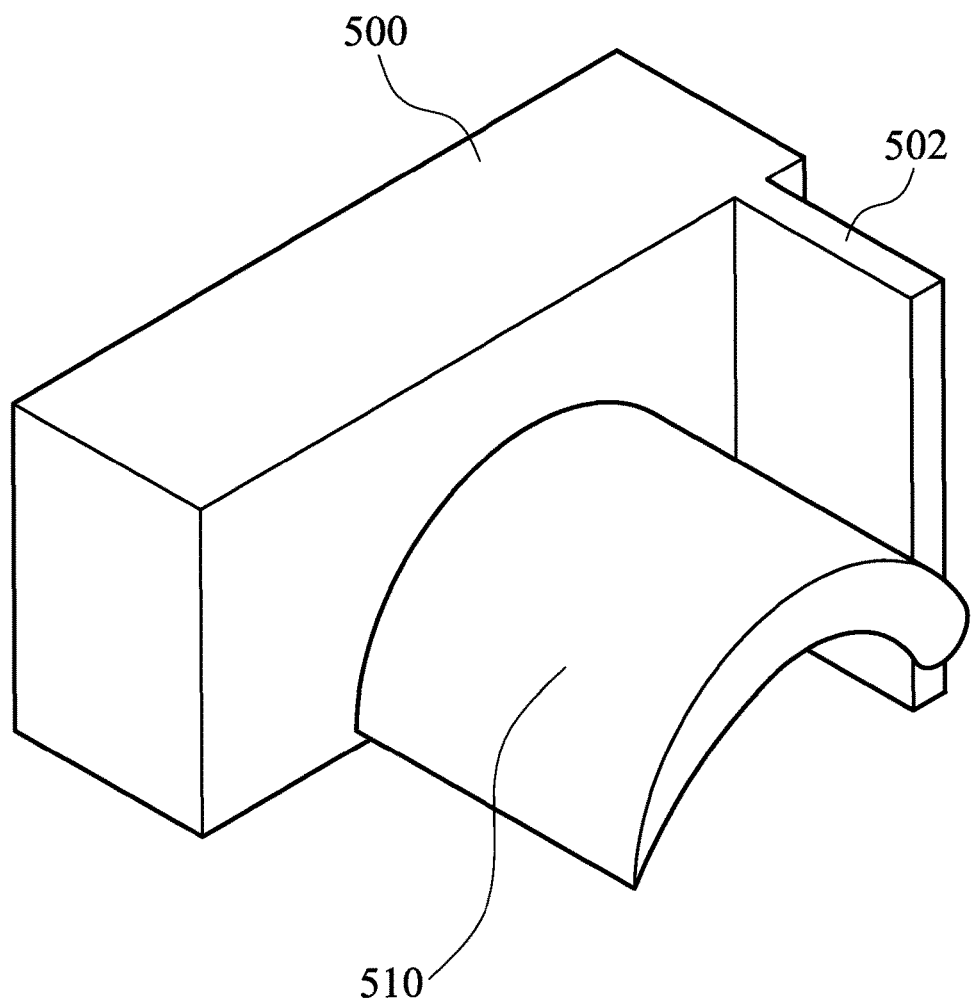
FIG. 5 is a schematic diagram of a measurement environment according to an embodiment.
Figure 6A:
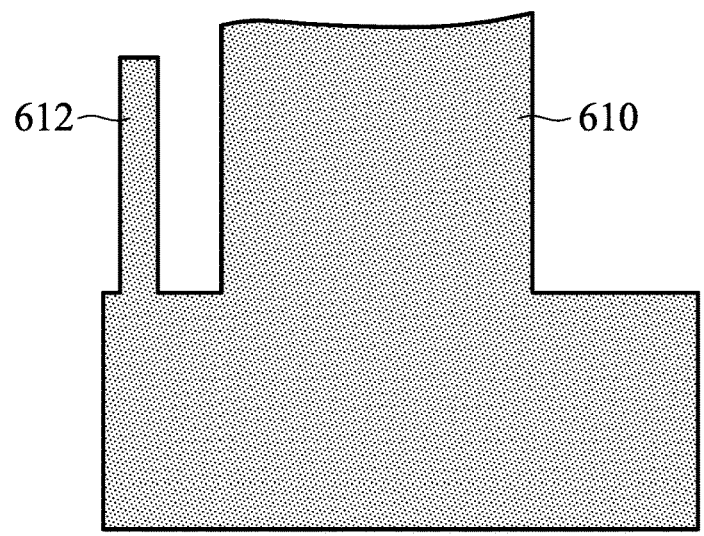
FIGS. 6A and 6B are schematic diagrams illustrating some exemplary 2D images of an object according to an embodiment.
Figure 6B:
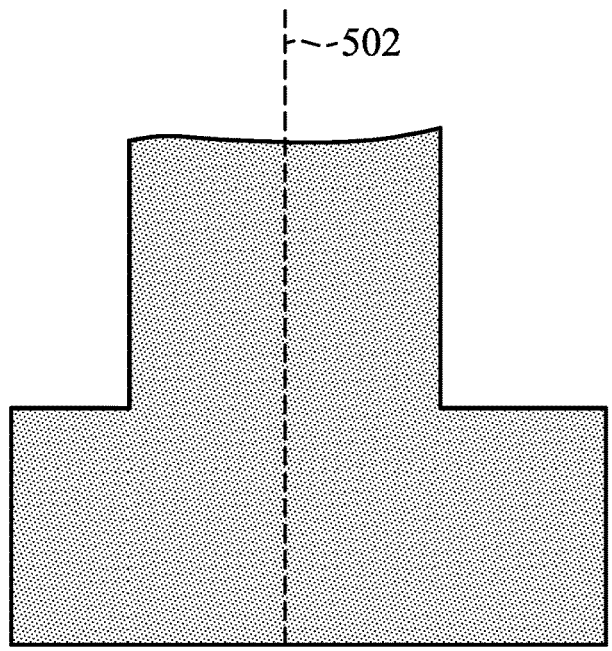
Figure 6C:
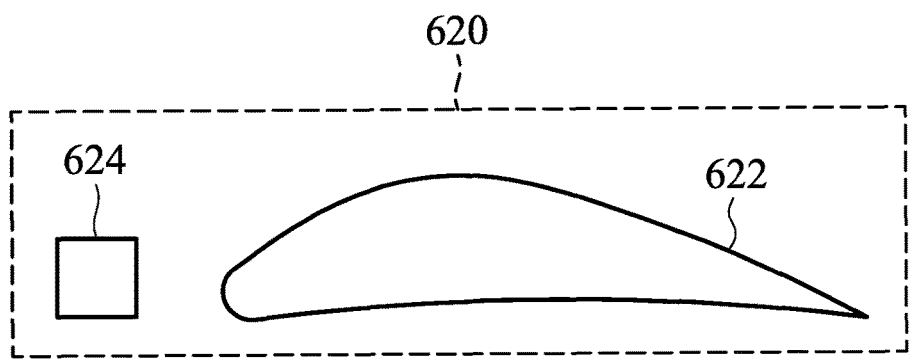
FIG. 6C is a schematic diagram illustrating an exemplary 3D measurement data of the object illustrated in FIGS. 6A and 6B.

FIG. 5 is a schematic diagram illustrating an exemplary embodiment of a measurement environment of the application. FIGS. 6A and 6B are schematic diagrams illustrating some exemplary embodiments of the 2D images of the application. FIG. 6C is a schematic diagram illustrating an exemplary embodiment of a 3D measurement data of the application.

As shown in FIG. 5, in this embodiment, an object 510 to be measured having an arc-shaped feature is held in a fixture 500, wherein a prominent solid plane 502 of the fixture 500 may be used as a reference object.

When a multi-dimensional measurement of the size of the object 510 to be measured is being performed, first, the measurement system 100 acquires measurement data of the object 510 to be measured, in which the measurement data includes 2D data and 3D data. Specifically, 2D image of the object 510 to be measured may be captured by the 2D image capturing device 110 and 3D point cloud data of the object 510 may be acquired by the 3D information acquisition device 120, as shown from FIG. 6A to FIG. 6C. FIG. 6A shows a 2D projection image 610 of the object 510 to be measured captured by the 2D image capturing device 110 (e.g., a CCD camera), wherein the 2D projection image 610 contains a reference 2D projection image 612 of the reference plane 502. FIG. 6B is a schematic diagram illustrating another 2D projection image 610 of the object 510 to be measured captured by the 2D image capturing device 110 (e.g., a CCD camera) in another embodiment in which the reference object is a virtual reference plane that uses the central axis of the object 510 to be measured as its central axis 502. As shown in FIG. 6C, 3D information 620 (represented by the 3D point cloud data) of the object 510 to be measured acquired by the 3D information acquisition device 120 (e.g., a linear laser displacement sensor) includes 3D information 622 of the object 510 to be measured and 3D information 624 of the reference plane 502.

Figure 7A:
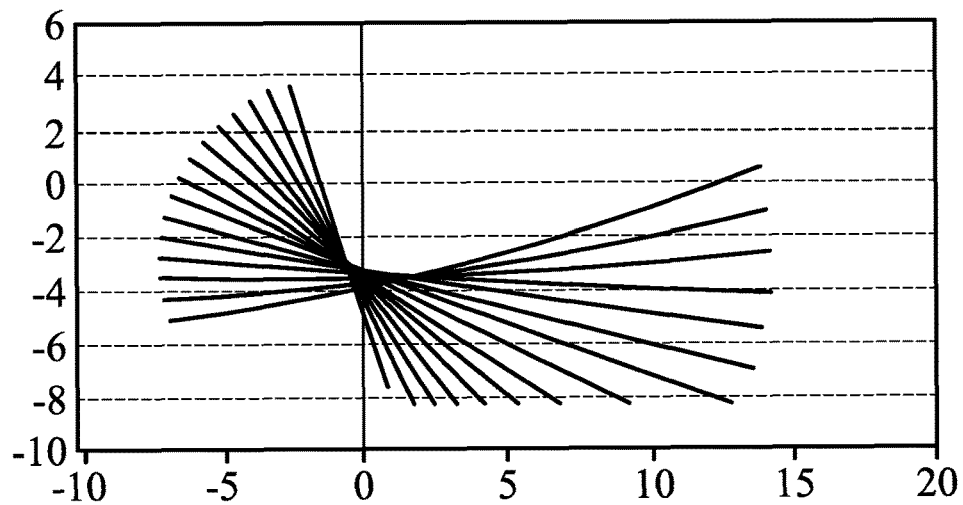
FIGS. 7A and 7B are schematic diagrams illustrating some exemplary 3D point cloud data according to an embodiment.
Figure 7B:
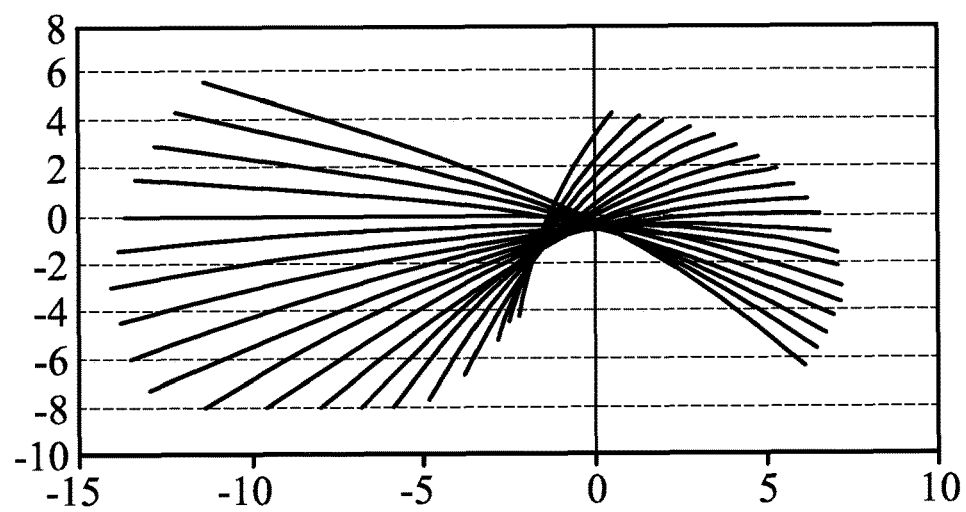

Next, the integration and estimation device 130 calculates the central axis information for the 3D point cloud data. In this step, the integration and estimation device 130 applies the 3D point cloud data obtained to the input layer of the machine learning engine and finds the best fitting function through the CPN. FIGS. 7A and 7B are schematic diagrams illustrating some exemplary embodiments of the 3D point cloud data and respective fitting functions of the application. It should be understood that, a number of parabolic curve equations are used in the embodiments of FIGS. 7A and 7B for illustration purpose, and the application is not limited thereto. As shown in FIGS. 7A and 7B, the 3D point cloud data acquired at various angles of different surfaces for the object 510 to be measured are shown, in which these 3D point cloud data obtained at different angles can further be matched with 15 parabolic curve fitting functions.

Figure 8:
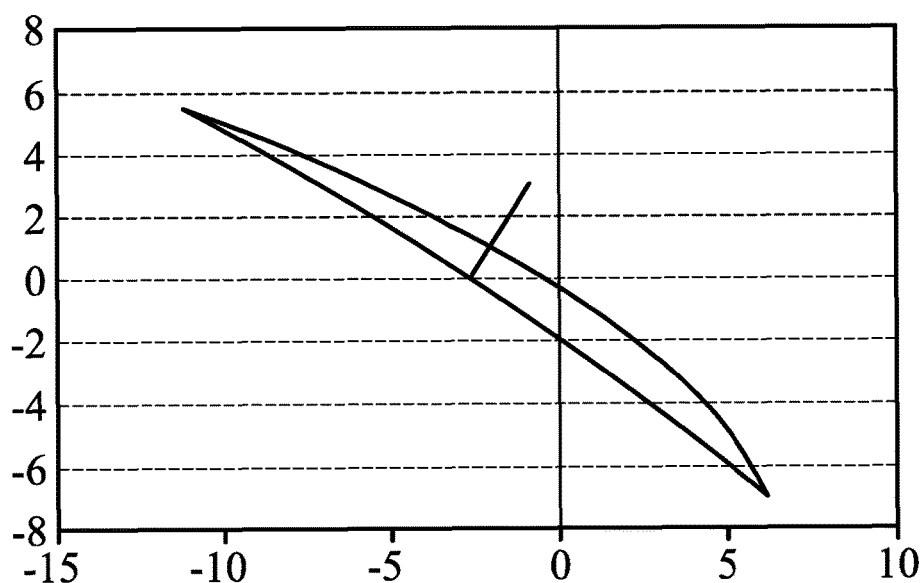
FIG. 8 is a schematic diagram illustrating an exemplary 3D topography data according to an embodiment.

Thereafter, the integration and estimation device 130 uses the least squares difference (LSD) algorithm to find parameters of a fitting function with the minimum difference among the 15 parabolic curve fitting functions and calculates the position of the central axis accordingly. After obtaining information containing the position of the central axis, the integration and estimation device 130 integrates the data based on the information containing the position of the central axis to perform an image registration thereon to obtain the appearance for the 3D object, so as to generate the corresponding 3D topography data, as shown in FIG. 8. FIG. 8 is a schematic diagram illustrating an exemplary embodiment of the 3D topography data of the application. The 3D topography data as shown in FIG. 8 represents a specific cross sectional view of the object 510 being measured.

The integration and estimation device 130 then uses the central axis of the object 510 to be measured as a virtual reference object (as shown in FIG. 6B) and uses the 3D topography data shown in FIG. 8 as integrated information for the 3D information acquisition device 120 in which this information should include the point cloud data corresponding to the virtual plane of the reference central axis. After that, the integration and estimation device 130 performs a coordinate conversion by the reference plane and aforementioned formulas (1) and (2) to perform the 2D and 3D data integration.

The integration and estimation device 130 may then apply the fitting function (e.g., a parabolic curve equation) corresponding to the adapted model to the integrated data so as to construct the 3D shape or 3D topography of the object 510 being measured, such as a virtual object with an arc-shaped structure. Then, various measurements may be performed on the virtual object, such as measured surface determination for the virtual object and edge detection or distance measurement for the measured surface on the virtual object, measuring the angle between the lines in the virtual object and any other geometric measurements, to obtain the corresponding estimated feature amount so as to obtain the corresponding measurement results in accordance with one or more corresponding estimated feature amounts. After the one or more measurement results corresponding to the object have been obtained, the one or more measurement results corresponding to the 3D object are displayed by the display device 150 (e.g., a liquid crystal display (LCD) screen).

In summary, the system of multi-dimensional measurement and a related method are provided for measuring multiple dimensions of an object of the application that can acquire 3D information of an object to be measured through a non-contact optical image capturing device and obtain a 2D projection image of the object through an optical image capturing device and integrate the 3D data and 2D image at the same time based on the 3D information and image stitching technology and intelligent image segmentation technology, which can provide advantages of both conventional 2D image-based measurement system and conventional 3D image-based measurement system, thus providing precise measurement of the object with a size of multiple dimensions and obtain a measured size of the object being measured, and further achieving the needs of multi-dimensional size measurement for the object.

Methods, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application specific logic circuits.

While the application has been described by way of example and in terms of exemplary embodiment, it is to be understood that the application is not limited thereto. Those who are skilled in this technology can still make various alterations and modifications without departing from the scope and spirit of this application. Therefore, the scope of the present application shall be defined and protected by the following claims and their equivalents.

What is claimed is:
1. A measurement system, comprising:
   a two-dimensional (2D) image capturing device configured to capture at least one macroscopic 2D image of an object to be measured, wherein the macroscopic 2D image corresponds to all areas of the object;
   a three-dimensional (3D) information acquisition device configured to acquire microscopic 3D measurement data of the object, wherein the microscopic 3D measurement data corresponds to some of the areas of the object; and
   an integration and estimation device coupled to the 2D image capturing device and the 3D information acquisition device, configured to receive the macroscopic 2D image and the microscopic 3D measurement data and perform a 2D and 3D image correction on the macroscopic 2D image and the microscopic 3D measurement data to map the microscopic 3D measurement data into the macroscopic 2D image so as to output 3D topography data corresponding to the macroscopic 2D image of the object; and a display device coupled to the integration and estimation device, configured to display one or more measurement results corresponding to the object;

wherein the integration and estimation device performs a matching procedure on at least one connection feature between any two positions in the 3D topography data with a plurality of 2D models in a database based on a machine learning mechanism to elect an adapted model, and estimates all of the connection features of the 3D topography data based on at least one fitting function corresponding to the adapted model so as to output at least one estimated feature amount, thereby obtaining the one or more measurement results corresponding to the object.

2. The measurement system as claimed in claim 1, wherein the 2D image capturing device further captures a reference 2D image for a reference object and the 3D information acquisition device further acquires a reference 3D measurement data for the reference object, and the integration and estimation device further performs the 2D and 3D image correction on the macroscopic 2D image and the microscopic 3D measurement data using the reference 2D image and the reference 3D measurement data to map the microscopic 3D measurement data into the macroscopic 2D image.

3. The measurement system as claimed in claim 1, wherein the integration and estimation device respectively performs a coordinate conversion on the macroscopic 2D image and the microscopic 3D measurement data using the reference 2D image and the reference 3D measurement data to simultaneously convert coordinate systems of the macroscopic 2D image and the microscopic 3D measurement data into a first coordinate system corresponding to the reference object, so as to perform the 2D and 3D image correction by the first coordinate system.

4. The measurement system as claimed in claim 3, wherein the 2D image capturing device includes a first field of view (FOV) and a first image resolution and the 3D information acquisition device includes a second FOV and a second image resolution, and the integration and estimation device further performs the coordinate conversion on the macroscopic 2D image and the microscopic 3D measurement data according to the first FOV, the first image resolution, the second FOV and the second image resolution.

5. The measurement system as claimed in claim 1, wherein the reference object is a solid plane having a fixed position.

6. The measurement system as claimed in claim 1, wherein the reference object is a virtual plane corresponding to a central axis of the object.

7. The measurement system as claimed in claim 1, wherein the machine learning mechanism includes the neural network algorithms of a Back-Propagation Network (BPN) and/or a Counter-Propagation Network (CPN).

8. The measurement system as claimed in claim 1, wherein the 3D information acquisition device is a non-contact optical image capturing device.

9. The measurement system as claimed in claim 1, wherein the 3D information acquisition device further comprises:
a depth signal acquisition element configured to receive depth signals from the object;
a depth information calculation element configured to calculate depth information for the object according to the received depth signals of the object; and
a depth information output element to output the depth information for the object as measurement information.

10. A method for use in a measurement system, wherein the measurement system at least comprises a two-dimensional (2D) image capturing device, a three-dimensional (3D) information acquisition device, an integration and estimation device and a display device, the method comprising:
capturing, by the 2D image capturing device, at least one macroscopic 2D image of an object to be measured, wherein the macroscopic 2D image corresponds to all areas of the object;
acquiring, by the 3D information acquisition device, microscopic 3D measurement data of the object, wherein the microscopic 3D measurement data corresponds to some of the areas of the object;
performing, by the integration and estimation device, a 2D and 3D image correction on the macroscopic 2D image and the microscopic 3D measurement data to map the microscopic 3D measurement data into, the macroscopic 2D image so as to output 3D topography data corresponding to the macroscopic 2D image of the object;
performing, by the integration and estimation device, a matching procedure on at least one connection feature between any two positions in the 3D topography data with a plurality of 2D models in a database based on a machine learning mechanism to elect an adapted model, and estimating all of the connection features of the 3D topography data based on at least one fitting function corresponding to the adapted model so as to output at least one estimated feature amount, thereby obtaining one or more measurement results corresponding to the object; and
displaying, by the display device, the one or more measurement results corresponding to the object.

11. The method as claimed in claim 10, further comprising:
providing a reference object;
capturing, by the 2D image capturing device, a reference 2D image for the reference object;
acquiring, by the 3D information acquisition device, a reference 3D measurement data for the reference object; and
performing, by the integration and estimation device, the 2D and 3D image correction on the macroscopic 2D image and the microscopic 3D measurement data using the reference 2D image and the reference 3D measurement data to map the microscopic 3D measurement data into the macroscopic 2D image.

12. The method as claimed in claim 10, wherein the step of performing, by the integration and estimation device, the 2D and 3D image correction on the macroscopic 2D image and the microscopic 3D measurement data using the reference 2D image and the reference 3D measurement further comprises:
respectively performing, by the integration and estimation device, a coordinate conversion on the macroscopic 2D image and the microscopic 3D measurement data using the reference 2D image and the reference 3D measurement data to simultaneously convert coordinate systems of the macroscopic 2D image and the microscopic 3D measurement data into a first coordinate system corresponding to the reference object, so as to perform the 2D and 3D image correction by the first coordinate system.

13. The method as claimed in claim 12, wherein the 2D image capturing device includes a first field of view (FOV) and a first image resolution and the 3D information acquisition device includes a second FOV and a second image resolution, and the step of respectively performing, by the integration and estimation device, the coordinate conversion on the macroscopic 2D image and the microscopic 3D measurement data using the reference 2D image and the reference 3D measurement data further comprises:

performing the coordinate conversion on the macroscopic 2D image and the microscopic 3D measurement data according to the first FOV, the first image resolution, the second FOV and the second image resolution.

14. The method as claimed in claim 10, wherein the reference object is a solid plane having a fixed position.

15. The method as claimed in claim 10, wherein the reference object is a virtual plane corresponding to a central axis of the object.

16. The method as claimed in claim 10, wherein the machine learning mechanism includes the neural network algorithms of a Back-Propagation Network (BPN) and/or a Counter-Propagation Network (CPN).

17. The method as claimed in claim 10, wherein the 3D information acquisition device is a non-contact optical image-taking device.

18. The method as claimed in claim 10, wherein at least one macroscopic 2D image is a projection image and the microscopic 3D measurement data is point cloud data.

* * * * *